United States Patent [19]

Jones

[11] 4,201,086
[45] May 6, 1980

[54] VIEWING ROD FOR DETERMINING THE LEVEL OF LIQUID WITHIN A RECEPTACLE

[76] Inventor: Ira D. Jones, 1023 S. Main St., South Bend, Ind. 46601

[21] Appl. No.: 962,285

[22] Filed: Nov. 20, 1978

[51] Int. Cl.² .............................................. G01F 23/02
[52] U.S. Cl. ....................... 73/327; 116/227; 350/96.2
[58] Field of Search ................ 73/327, 293; 116/227; 350/96.10, 96.2

[56] References Cited
U.S. PATENT DOCUMENTS

| | | | |
|---|---|---|---|
| 1,883,971 | 10/1932 | Kryzanowsky | 73/327 |
| 2,301,460 | 11/1942 | Sauer | 73/327 |
| 2,484,329 | 10/1949 | Angel et al. | 73/293 |
| 2,943,530 | 7/1960 | Nagel | 73/327 X |
| 3,319,597 | 5/1967 | Schnitzius et al. | 73/327 X |
| 3,367,184 | 2/1968 | McHugh | 73/327 |
| 3,570,311 | 3/1971 | Nelson | 116/227 X |
| 3,675,483 | 7/1972 | David | 73/327 |
| 3,796,098 | 3/1974 | Trayer | 73/327 |

*Primary Examiner*—Daniel M. Yasich
*Attorney, Agent, or Firm*—Oltsch, Knoblock & Hall

[57] ABSTRACT

A viewing rod in which a visual change in color at the transmitting end of the rod indicates that the level of the liquid within a receptacle has reached the transmitting end.

1 Claim, 7 Drawing Figures

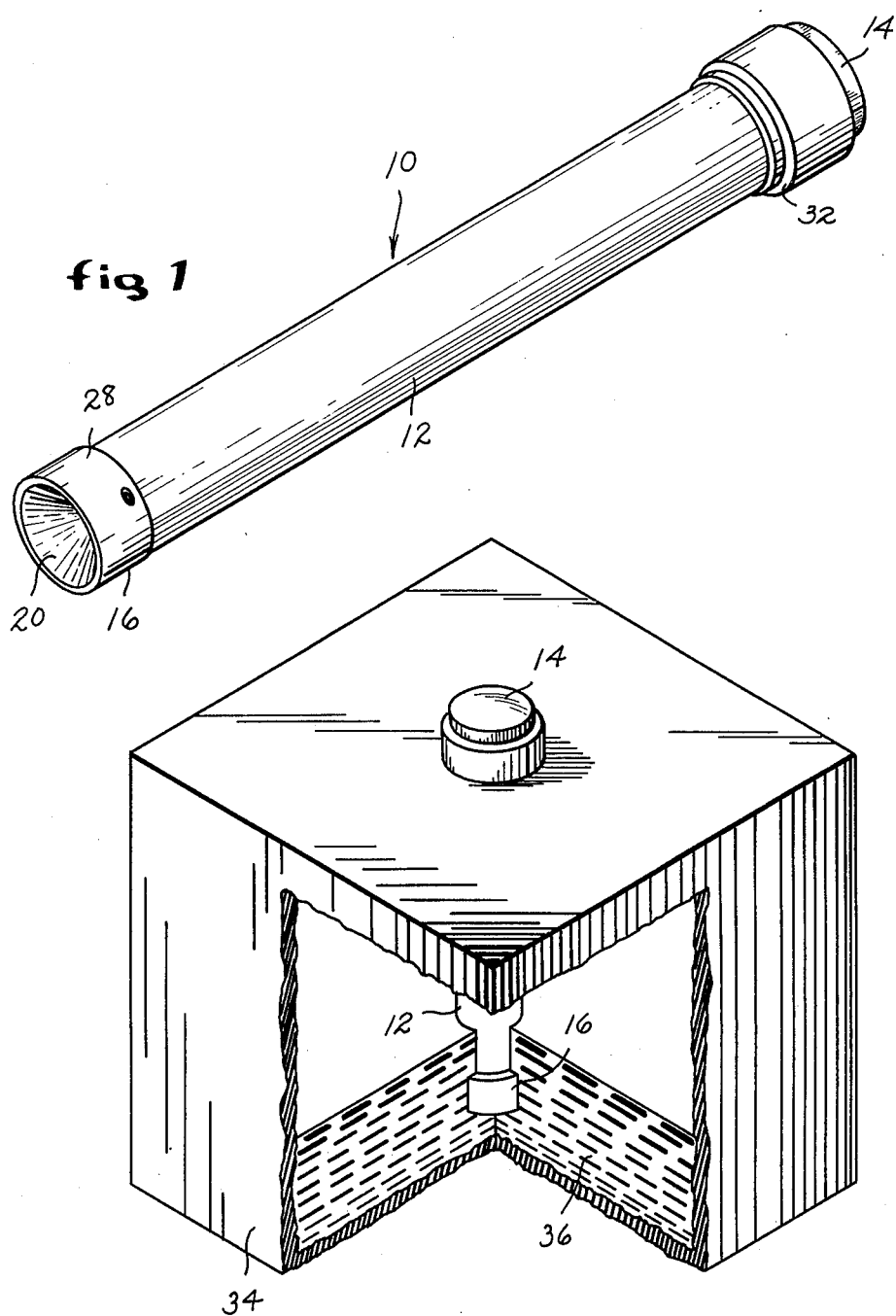

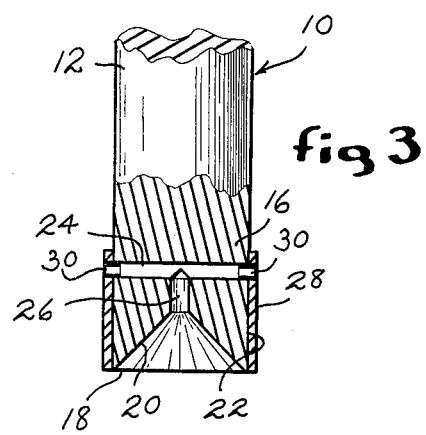
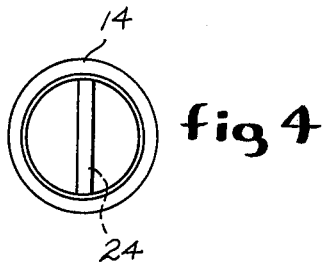
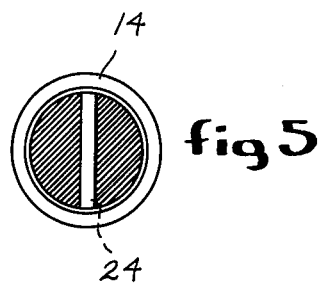
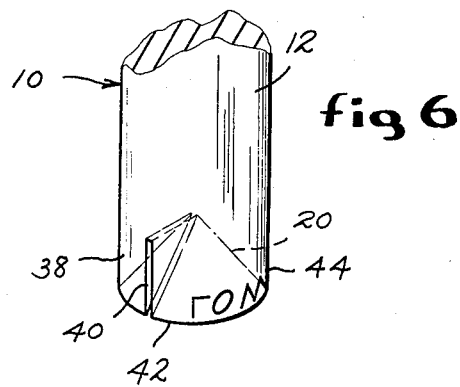
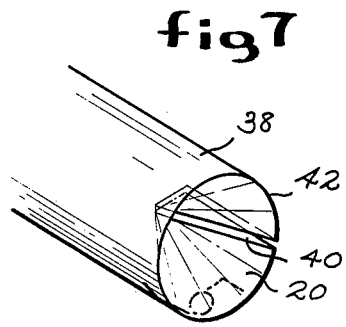

VIEWING ROD FOR DETERMINING THE LEVEL OF LIQUID WITHIN A RECEPTACLE

SUMMARY OF THE INVENTION

This invention relates to a device for viewing the level of liquid within a receptacle and will have particular application to a light transmitting viewing rod.

The viewing device of this invention is a rod having light transmitting properties and which includes an upper viewing end and a lower image transmitting end. The transmitting end of the rod is provided with a concave conical depression in its end face which defines a convex conical surface. A vent is formed into the concave depression in the rod to allow the depression to fill with liquid when the liquid level is above the transmitting end of the rod. With the rod anchored suitably to the receptacle and the liquid level above the transmitting end of the rod, the liquid will be viewed when sighting through the rod from its viewing end. When the level of the liquid reaches the image transmitting end of the rod, a change in appearance occurs at the image transmitting end when viewed from the viewing end of the rod, thus indicating a change in the level of the liquid.

Accordingly, it is an object of this invention to provide a device for viewing the level of liquid within a receptacle.

Another object of this invention is to provide a rod having light transmitting properties and through which the level of liquid within a receptacle can be determined.

Another object of this invention is to provide an economical and accurate viewing device for indicating when the liquid level within a receptacle reaches a predetermined position.

Other objects of this invention will become apparent upon a reading of the invention's description.

BRIEF DESCRIPTION OF THE DRAWINGS

FIG. 1 is a perspective view of one embodiment of the viewing rod of this invention.

FIG. 2 is a perspective view showing the rod of FIG. 1 in use with portions of the receptacle and liquid therein broken away for purposes of illustration.

FIG. 3 is a fragmentary longitudinal sectional view of the image transmitting end of the rod of FIG. 1.

FIG. 4 is a plan view looking downwardly through the rod of FIG. 1 from its image viewing end with the liquid level as illustrated in FIG. 2.

FIG. 5 is a plan view when looking downwardly through the rod from its image viewing end with the liquid level below the image transmitting end of the rod.

FIG. 6 is a fragmentary perspective view of a viewing rod having a modified image transmitting end.

FIG. 7 is a fragmentary perspective view of the rod image transmitting end shown in FIG. 6 as seen from below.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The viewing rod 10 shown in FIGS. 1-5 includes a body 12 of cylindrical form having an upper viewing end 14 and a lower image transmitting end 16. Rod 10 is transparent along its axis from viewing end 14 to image transmitting end 16 and is light transmitting. In an actual construction of viewing rod 10, the rod was formed of a cast acrylic material having a refraction index of between 1.48 and 1.50 with the rod being utilized to observe the liquid level of oil within a transformer.

Image transmitting end 16 of rod 10 includes an end face interrupted by a concave conical depression which defines a concave conical surface 20. Conical surface 20 is transparent and coaxial with the axis of rod 10 with the surface extending at a 45° angle to the axis of the rod.

A transverse bore 24 extends through rod 10 and is located adjacently above the apex of the depression formed by conical surface 20. A small coaxial bore 26 interconnects the apex of conical surface 20 with transverse bore 24. A sleeve 28 is fitted over outer rod surface 22 at the image transmitting end 16 of rod 10. Sleeve 28 extends from end edge 18 of rod end 16 to slightly above transverse bore 24. Sleeve 28 includes holes formed in alignment with bore 24 and through which hollow retainer pins 30 are inserted to fixedly secure the sleeve to the rod's image transmitting end 16. Sleeve 28 is opaque and is colored in such a manner to enable it to be differentiated by sight from that of the liquid into which the image transmitting end 16 of rod 10 is placed.

Rod 10 is provided with a shoulder part 32 which allows it to be supported by a receptacle 34 with its image transmitting end 16 being submerged in a liquid 36 within the receptacle. Ambient light passes downwardly through rod 10 from the viewing end 14 to image transmitting end 16. The outer cylindrical surface of rod 10 is preferably polished to assist in the transmission of light through the rod. With the level of liquid 36 above rod image transmitting end 16, as shown in FIG. 2, and with the liquid having a generally clear consistency, image transmitting end 16 will appear, when seen through viewing end 14 along the axis of rod 10, as illustrated in FIG. 4. In this condition, liquid will fill the depression defining conical surface 20 and the light rays will pass through surface 20 into the liquid 36 due to the compatible indexes of refraction of the rod and of the liquid.

When the level of liquid 36 reaches image transmitting end 16 of rod 10, ambient air will enter the depression under conical surface 20 because of bores 24 and 26. As this air displaces the liquid within the depression at the image transmitting end of rod 10, the indexes of refraction between that of the rod and the air within the depression causes the light to be reflected laterally from surface 20 against sleeve 28. This will cause a change, as illustrated in FIG. 5, in the visual observation of transmitting end 16 of rod 20 when viewed from its viewing end 14. The color of sleeve 28 becomes apparent to the observer from the viewing end 14 of the rod to indicate that the liquid 36 within receptacle 34 has reached a particular level.

In FIGS. 6 and 7 viewing rod 10 is modified at its image transmitting end 38. The image transmitting end 38 of this embodiment does not carry a sleeve 28, as illustrated in FIGS. 1-3, but instead is of a polished surface like the remainder of body 12 of the rod. A longitudinally directed slot 40 extends from end edge 42 of image transmitting end 38 to the apex of the depression defining conical surface 20, at one side of the rod. Slot 40 serves the same purpose as bores 24 and 26 in the embodiment of FIGS. 1-3 in that when the level of the liquid in the receptacle is below the apex of the depression ambient air will be vented into the depression. In this embodiment the word "LOW" is imprinted upon the outer surface 44 of image transmitting end 38 just above end edge 42. The letters of the word are inverted as illustrated so that when the liquid level is below end edge 42, the letters will be visible to form the word "LOW" as the image transmitting end of the rod is viewed from the rod's viewing end. As described for the embodiment of the viewing rod of FIGS. 1-3, the observation of the word "LOW" occurs due to a difference in the indexes of refraction between that of the ambient air and the rod which causes a lateral deflection of the light from surface 20 through the outer surface of the rod at its image transmitting end 38.

The image transmitting end of the viewing tube may have its outer surface coated, covered as illustrated in the embodiment of FIGS. 1-3, or be of a transparent nature depending upon the type and color of liquid being observed. In each case a correlation between the color and type of liquid and the coating, covering, indicia or lack of indicia at the image transmitting end of the rod is utilized to produce a change in visual observation as the image transmitting end is exposed or covered by the liquid.

This invention is not to be limited to the details above given but may be modified within the scope of the appended claims.

What I claim is:

1. A device for viewing the level of liquid within a receptacle comprising a rod having light transmitting properties and an axis, said rod including a viewing end and an image transmitting end, said transmitting end having an end face interrupted by a concave conical depression defining a concave conical surface and being surrounded by an opaque sleeve, said sleeve extending from the end face of said image transmitting end to intermediate said rod ends, said rod having an exterior surface laterally disposed from said rod axis and about said conical surface, a transverse bore through said rod and sleeve in communication with said depression, a hollow pin fitted into said bore at the sleeve to secure the sleeve to the rod, and means for anchoring said rod to said receptacle in a vertical orientation, whereby the level of said liquid when reaching said rod transmitting end will cause the venting of said depression and a change in visual observation of the transmitting end when viewed from the viewing end of said rod along said rod axis.

* * * * *